United States Patent
Rose et al.

(10) Patent No.: US 9,438,721 B2
(45) Date of Patent: Sep. 6, 2016

(54) SYSTEMS AND METHODS FOR MANAGING OPERATING MODES OF AN ELECTRONIC DEVICE

(71) Applicant: Motorola Mobility LLC, Chicago, IL (US)

(72) Inventors: Mark A Rose, San Jose, CA (US); Simon Azriel, Sunnyvale, CA (US); Eva Bills Lacivita, Grayslake, IL (US); Akila Varadarajan, San Jose, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 86 days.

(21) Appl. No.: 14/469,800

(22) Filed: Aug. 27, 2014

(65) Prior Publication Data

US 2016/0065722 A1    Mar. 3, 2016

(51) Int. Cl.
*H04W 88/06* (2009.01)
*H04M 1/725* (2006.01)
(Continued)

(52) U.S. Cl.
CPC ..... *H04M 1/72569* (2013.01); *H04M 1/72572* (2013.01); *H04W 4/04* (2013.01); *H04W 48/04* (2013.01); *H04W 88/02* (2013.01); *H04W 84/12* (2013.01)

(58) Field of Classification Search
CPC ..... H04W 4/22; H04W 60/04; H04W 88/04; H04W 24/08; H04W 88/02; H04W 88/00; H04W 48/18; H04W 84/12; H04W 88/06; H04W 4/04; G01C 218/00; G01G 5/363; H04B 3/54; H04M 1/72569; H04M 1/72572

USPC ........ 701/457, 410; 345/619; 370/389, 390, 370/352, 329, 338; 342/450
See application file for complete search history.

(56) References Cited

U.S. PATENT DOCUMENTS 8,639,439 B2 *  1/2014  Lee ............... G01C 21/3655
                                                701/410
2008/0159281 A1 *  7/2008  Jesseph ............ H04B 3/54
                                                370/389

(Continued)

FOREIGN PATENT DOCUMENTS

WO    2008027076 A1    3/2008
WO    2008152396 A1    12/2008

(Continued)

OTHER PUBLICATIONS

International Search Report and Written Opinion of International Application No. PCT/US2015/047191, mailed Nov. 2, 2015, 14 pp.

(Continued)

*Primary Examiner* — Hanh N Nguyen
(74) *Attorney, Agent, or Firm* — Shumaker & Sieffert, P.A.

(57) ABSTRACT

Embodiments are provided for distinguishing certain transportation modes for an electronic device based on connection signal data. According to certain aspects, the electronic device may determine (458) that it is being transported by a vehicle. The electronic device searches or detects (460) nearby WLAN and/or WPAN signals and identifies (464), based on the detected signals, how many devices are nearby the electronic device. The electronic device compares (468) the number of nearby devices to a threshold amount and, based on the comparison, either initiates (472) a public transportation mode or initiates (470) a driving mode.

17 Claims, 8 Drawing Sheets

(51) Int. Cl.
*H04W 48/04* (2009.01)
*H04W 4/04* (2009.01)
*H04W 88/02* (2009.01)
*H04W 84/12* (2009.01)

(56) References Cited

U.S. PATENT DOCUMENTS

| | | |
|---|---|---|
| 2011/0105082 A1 | 5/2011 | Haley |
| 2011/0136476 A1 | 6/2011 | Beasley |
| 2014/0336925 A1* | 11/2014 | Akin .................. G01C 21/00 701/457 |
| 2015/0097731 A1* | 4/2015 | Russell ................ G01S 19/48 342/450 |

FOREIGN PATENT DOCUMENTS

| | | |
|---|---|---|
| WO | 2011047304 A1 | 4/2011 |
| WO | 2013190380 A2 | 12/2013 |
| WO | 2014033350 A1 | 3/2014 |

OTHER PUBLICATIONS

John Callaham, "Microsoft Files Patent for Automatically Quieting Mobile", Nov. 18, 2013, 1 page.
Stefano Sanna, "Bluetooth Counter", http://code.google.com/p/android-bluetooth/, Jun. 17, 2010, 1 page.
Jens Weppner and Paul Lukowicz, "Bluetooth Based Collaborative Crowd Density Estimation with Mobile Phones", 2013 IEEE International Conference on Pervasive Computing and Communications, Mar. 18-22, 2013, pp. 193-200, San Diego, California, USA.

* cited by examiner

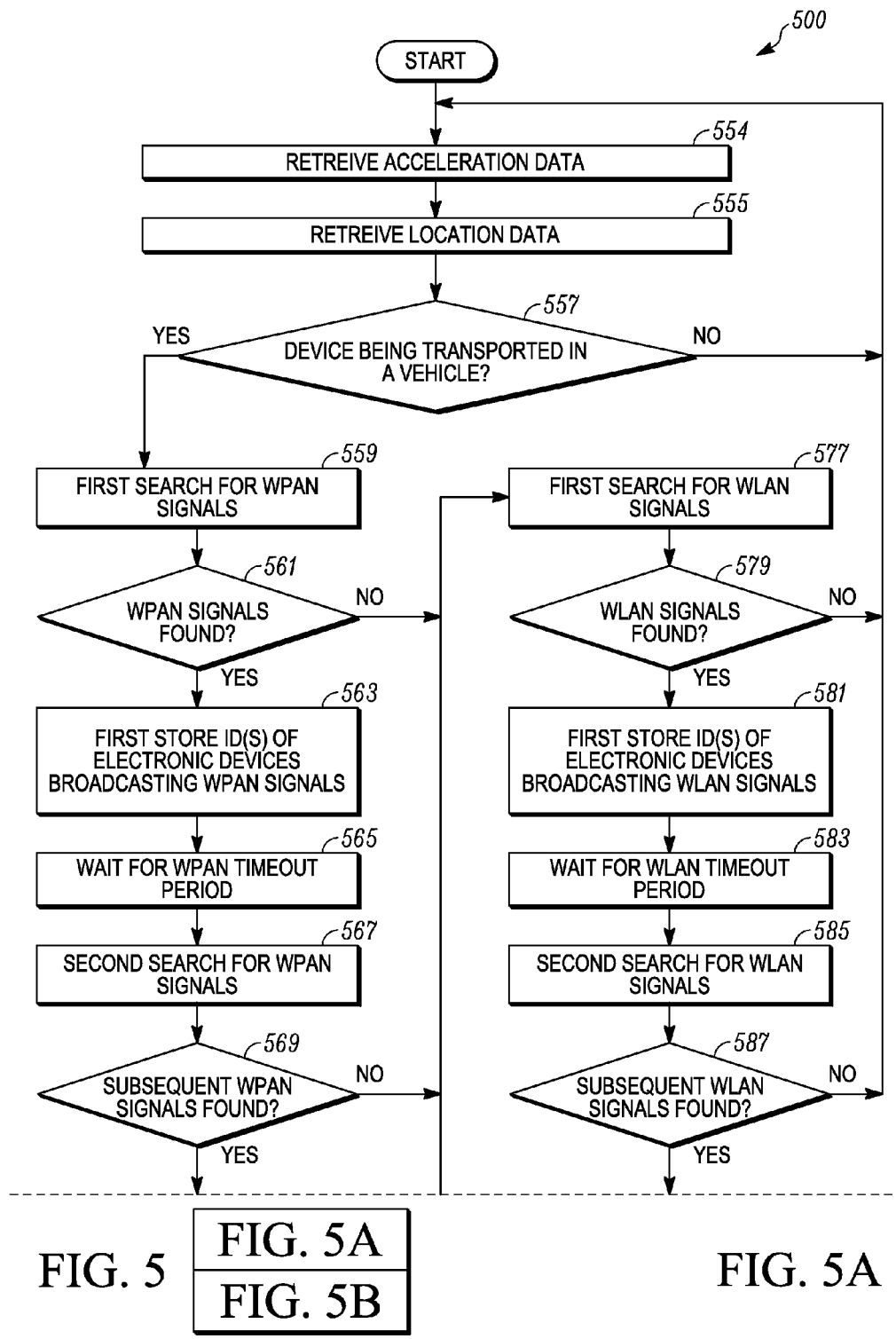

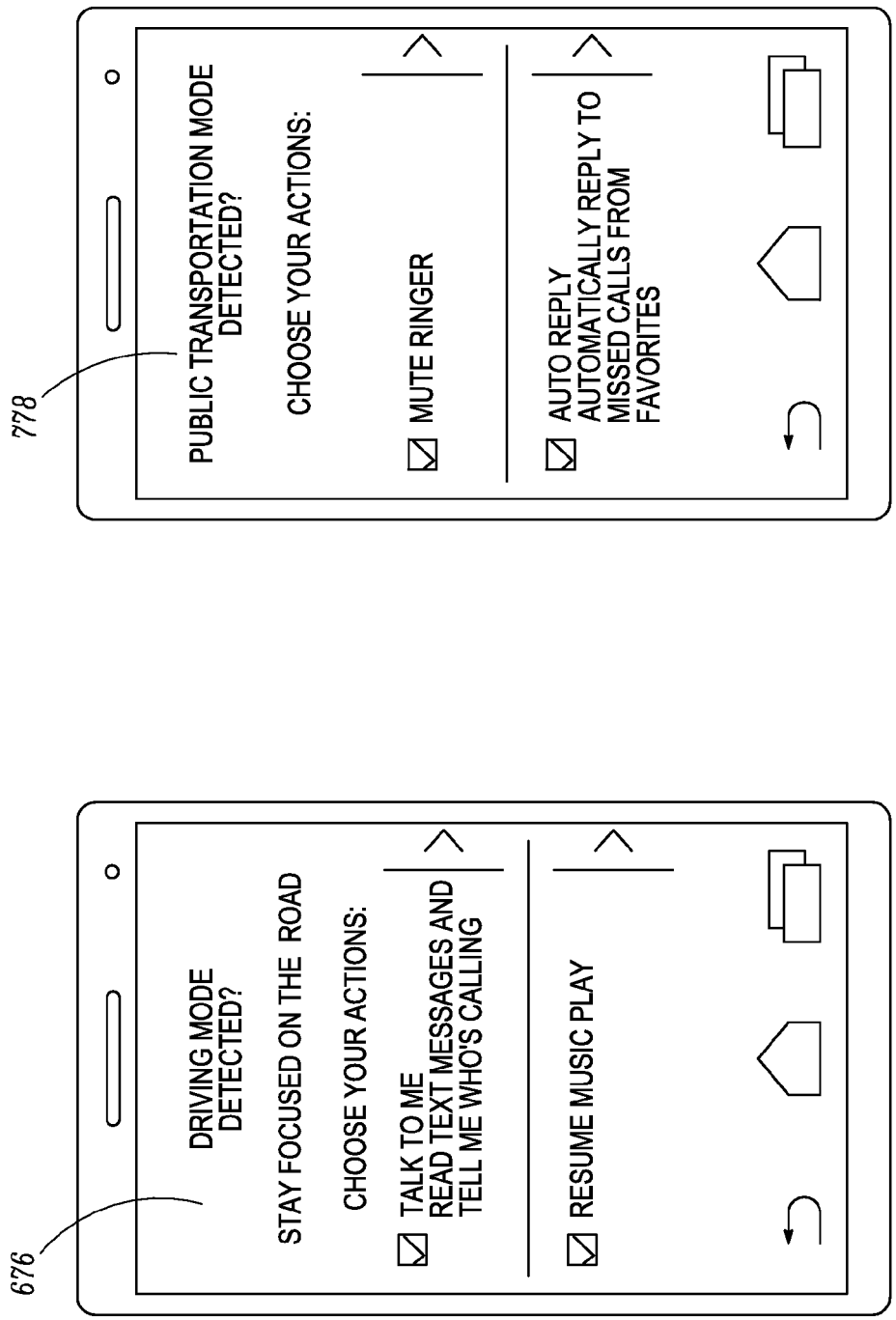

SYSTEMS AND METHODS FOR MANAGING OPERATING MODES OF AN ELECTRONIC DEVICE

FIELD

This application generally relates to managing operating modes of electronic devices. In particular, the application relates to platforms and techniques for determining a mode of transportation of an electronic device based on received connection signal data, and initiating a corresponding operating mode based on the mode of transportation.

BACKGROUND

As features and applications of electronic devices such as smart phones are improved, users are increasingly more willing to bring their electronic devices with them during travel. For example, users often have electronic devices in the car when commuting or on their person when exercising. Various applications exist to modify certain operating modes of electronic devices based on the state or condition of the electronic devices. For example, an electronic device may recognize when its user is in a meeting and may silence incoming calls and/or auto reply to missed calls.

In some cases, an electronic device may recognize when it is being transported, such as when it is in a vehicle. In these situations, the electronic device may modify its operating mode by audibly reciting text messages and identifications of incoming callers, or initiating audio playback when the vehicle is in motion. However, there are situations in which the electronic device is being transported by a vehicle but its user may not want certain of these features. For example, the user may not want audible text message recitation when the user is traveling via public transportation. Current techniques in electronic devices are not able to distinguish when the electronic device is being transported via private transportation (e.g., a user's vehicle) from when the electronic device is being transported via public transportation (e.g., a train).

Accordingly, there is an opportunity for techniques and analyses to distinguish between certain modes of transportation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

FIGS. 5A and 5B depict an additional flow diagram of an electronic device detecting various modes of transportation and modifying operating modes corresponding thereto, in accordance with some embodiments.

FIG. 6 depicts an example user interface associated with a driving mode of an electronic device, in accordance with some embodiments.

FIG. 7 depicts an example user interface associated with a public transportation mode of an electronic device, in accordance with some embodiments.

DETAILED DESCRIPTION

With an increasing number of device features and applications, users are more willing and able to operate their electronic devices while in transit, such as during vehicle travel or onboard public transportation. Certain human interface features of the electronic devices are more useful or desirable during public transportation while other features of the electronic devices are more useful or desirable during private vehicle travel. For example, a user may want an electronic device to audibly output incoming text messages while traveling by private car; whereas the user may want a ringer of the electronic device to be silenced while traveling via public transportation.

According to certain aspects, an electronic device is configured to determine, using location data and acceleration data, when it is in being transported by a vehicle. Because the electronic device may not be able to accurately determine whether it is being transported by private vehicle or via public transportation using location data and acceleration data only, the electronic device is further configured to analyze signal data corresponding to signals that originate from nearby devices or components. In some cases, the signal data may include wireless personal area network (WPAN) signals and/or wireless local area network (WLAN) signals that are broadcast by nearby electronic devices. In other cases, the signal data may identify a nearby wireless access point for a local area network or the like.

Generally, the greater number of nearby electronic devices that are detected, the greater the chance that the electronic device is being transported via public transportation. Further, an access point that is detected both before and after a threshold period of time is an indication that the electronic device is being transported via public transportation. Moreover, the electronic device may be on public transportation if the same nearby electronic devices are detected in multiple instances in time. After determining the mode of transportation from the signal data, the electronic device may modify its operating mode accordingly. The embodiments discussed herein therefore offer the benefit of seamless and dynamic mode management for various transport environments, which improves the user experience. This benefit is especially important as users increasingly carry their electronic devices during transit.

As described herein, it should be understood that a private vehicle may refer to any type of vehicle (e.g., bicycle, car, van, motorcycle, etc.) that is commonly operated by an individual owner or by someone else having permission from the individual owner. In contrast, public transportation may refer to modes of transportation that are available to the public. For example, public transportation may include trains, busses, subways, airplanes, and the like.

Figure 1:
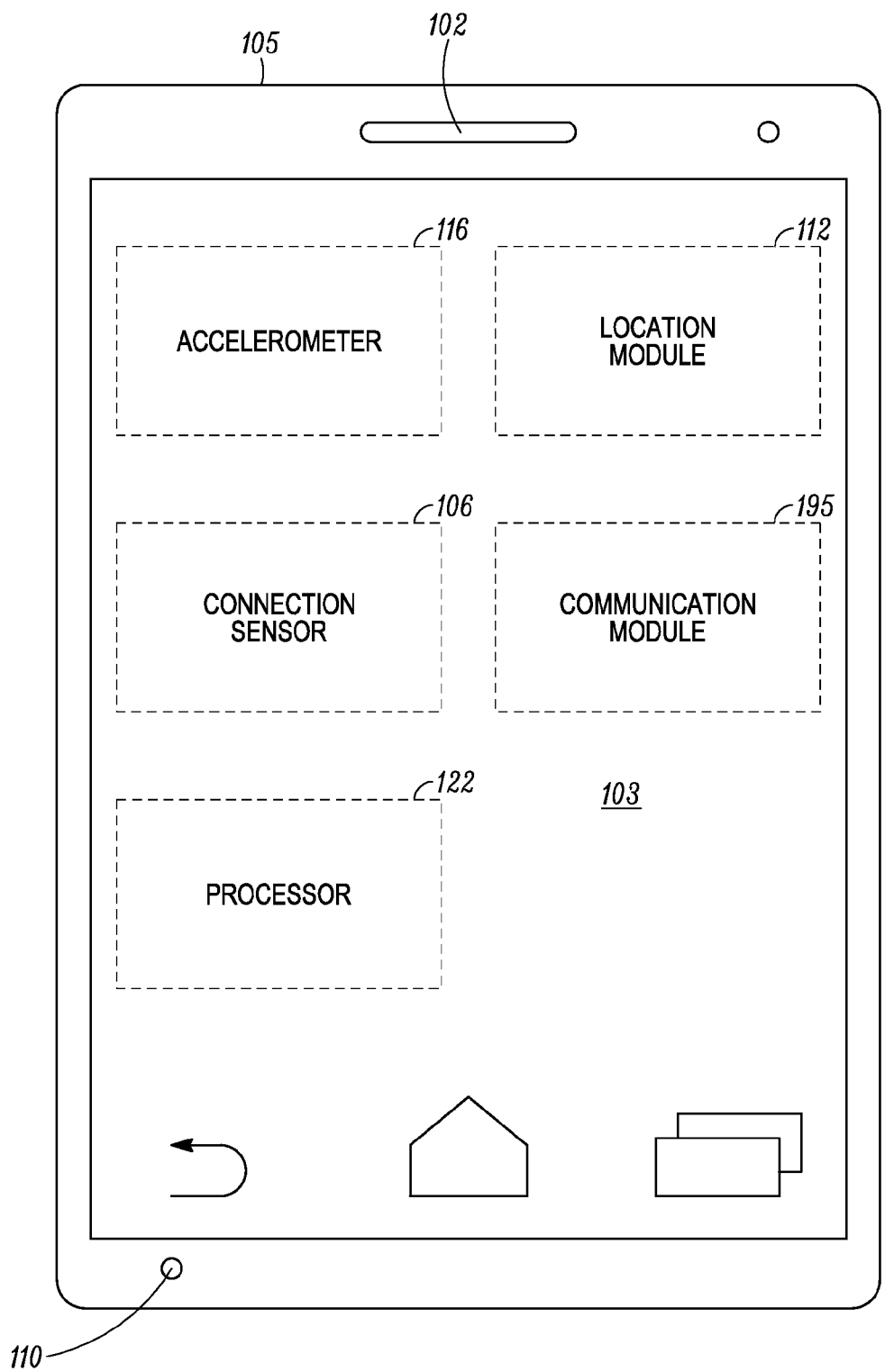
FIG. 1 depicts an example electronic device capable of facilitating various operating modes and functionalities, in accordance with some embodiments.

FIG. 1 depicts an example electronic device 105 configured to detect various modes of transportation, and initiate and facilitate various user interface operating modes depending on the mode of transportation. The electronic device 105 may be any type of portable electronic device, for example, a notebook computer, a mobile phone, a Personal Digital Assistant (PDA), a smart phone, a tablet computer, a multimedia player, an MP3 player, a digital broadcast receiver, a remote controller, a digital camera, a digital video recorder, or any other electronic apparatus.

The electronic device 105 may include a visual component 103 (e.g., a touchscreen or an electronic display) that is configured to display content. The electronic device 105 may also include one or more touch input components, such as a capacitive touch sensor integrated into a touchscreen or separate mechanical buttons, to receive or detect input from a user of the electronic device 105. The electronic device 105 may further include audio components such as a speaker 102 (for audio output) and a microphone 110 (for audio input) that may operate in conjunction with the visual component 103. Although the speaker 102 is illustrated in FIG. 1 as an "earpiece" speaker that is commonly utilized by the user during telephone calls or similar applications, it should be appreciated that electronic device 105 may alternatively or additionally include a "media" speaker capable of more output power. Further, it should be appreciated that the types, sizes, and locations of the speaker 102 and the microphone 110 are merely examples and that alternate or additional types, sizes, and locations are envisioned.

The electronic device 105 can include an accelerometer 116 configured to measure an acceleration or general movement of the electronic device 105 relative to gravity or momentum and generate resulting acceleration data. The accelerometer 116 may be a single- or multi-axis accelerometer that is capable of detecting magnitude and direction of the proper acceleration (e.g., g-force) of the electronic device 105, and can be used to sense orientation, vibration, and/or other parameters. The electronic device 105 can additionally include a location module 112 that is configured to detect a location of the electronic device 105. For example, the location module 112 may be a Global Positioning System (GPS) receiver.

The electronic device 105 can further include various sensors configured to detect general environment data associated with the electronic device 105. In particular, the electronic device 105 can include a connection sensor 106 that is configured to detect various wireless connection signals that originate from or are broadcast by nearby electronic devices or components. According to embodiments, the connection signals may include one or more wireless personal area network (WPAN) signals and/or one or more wireless local area network (WLAN) signals. The connection sensor 106 may be part of a communication module 195 configured to establish communication channels with nearby electronic devices or components. For example, the communication module 195 can connect to an access point associated with a WLAN. For further example, the communication module 195 can enable the electronic device 105 to connect to or "pair with" a WPAN device (e.g., a Bluetooth® device).

The electronic device 105 further includes a processor 122 that is configured to process signals and data associated with components of the electronic device 105 and facilitate various functions based on the signals and data. According to one particular functionality, the processor 122 is configured to analyze data from the accelerometer 116 and the location module 112 to determine whether the electronic device 105 is being transported by a vehicle. Further, the connection sensor 106 is configured to detect connection signal data that is broadcast by WPAN or WLAN radios of nearby electronic devices. Through various logic, techniques, and algorithms, the processor 122 can analyze the detected sensor and signal data to determine a specific mode of transportation, such as whether the electronic device 105 is being transported by a private vehicle or via public transportation.

Figure 2:
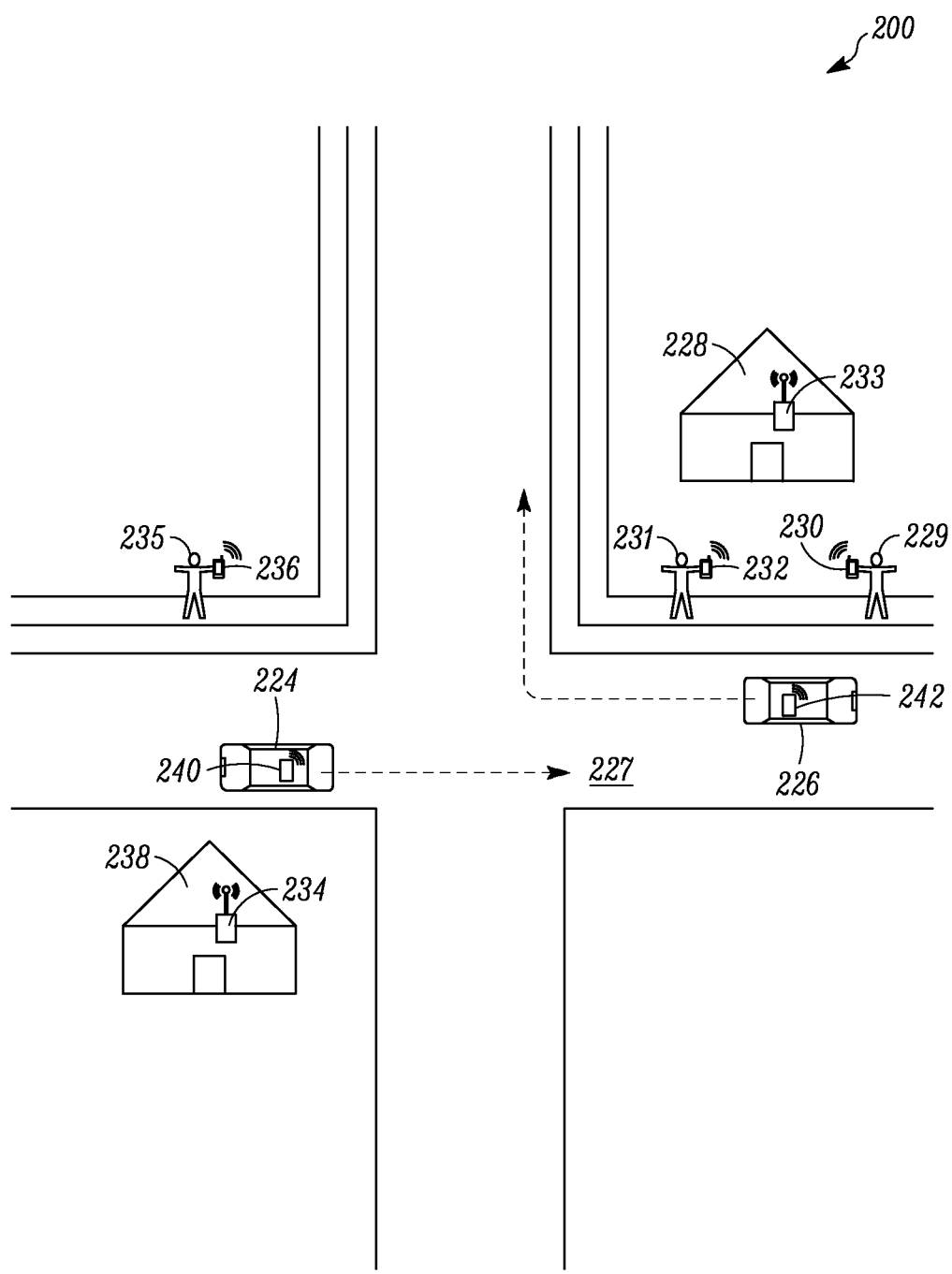
FIG. 2 depicts an example scenario illustrating an electronic device being transported by a private vehicle, in accordance with some embodiments.

FIG. 2 depicts an example scenario 200 illustrating connection signal possibilities for an electronic device being transported by a private vehicle. As illustrated in FIG. 2, two private vehicles 224, 226 are being driven on a roadway 227. Further, there are two properties 228, 238 (e.g., homes, commercial buildings, etc.), that are positioned near the roadway 227. The property 228 has an access point 233 and the property 238 has an access point 234, whereby the access points 233, 234 enable wireless electronic devices to connect to a wired network using a WLAN (e.g., Wi-Fi or related standards) if the wireless electronic devices are within range of the access points 233, 234. The access points 233, 234 are capable of broadcasting signals including the service set identification (SSID) that identifies the corresponding network.

The scenario 200 further depicts multiple individuals 229, 231, 235 each holding or carrying a respective electronic device 230, 232, 236 capable of wireless communications. In particular, the electronic devices 230, 232, 236 are each capable of various WWAN, WLAN, and/or WPAN communications. The electronic devices 230, 232, 236 therefore have corresponding WWAN, WLAN, and/or WPAN radios that may transmit signals and search for corresponding wireless networks for connection opportunities.

The signals transmitted by the electronic devices 230, 232, 236 may include various information such as, for example, an identification of the respective electronic device 230, 232, 236 (e.g., a MAC address), any access points that the respective electronic device 230, 232, 236 is connected to, the vendor of the respective electronic device 230, 232, 236, the class (e.g., smartphone, handsfree, computer, LAN/network access point, etc.) of the respective electronic device 230, 232, 236, and/or other data. When received, the signals may each have an associated strength (e.g., received signal strength indication (RSSI)) which may generally indicate the distance from the respective electronic device 230, 232, 236 to the device that detects the signals. In cases in which the electronic devices 230, 232, 236 are configured for WPAN communication (e.g., Bluetooth® communication), the signals may also include a WPAN address (i.e., a "friendly Bluetooth name") of the respective electronic device 230, 232, 236.

Each of the private vehicles 224, 226 may be transporting a respective electronic device 240, 242 (such as the electronic device 105 discussed with respect to FIG. 1). For example, a vehicle operator of the private vehicle 224 may have his or her smartphone mounted on the dashboard of the private vehicle 224. The electronic devices 240, 242 of the private vehicles 224, 226 are configured to detect or otherwise sense the signals broadcast by nearby electronic devices or components. In particular, in the scenario 200, the electronic devices 240, 242 are configured to periodically scan for, detect, or otherwise receive the signals broadcast by the electronic devices 230, 232, 236 and the access points 233, 234.

According to embodiments, the electronic devices 240, 242 may analyze the detected signals (generally, the communication signal data) and use other sensor information to determine a mode of transportation (i.e., determine how the respective electronic device 240, 242 is being transported).

Generally, the fewer persistent WLAN and/or WPAN signals that the electronic devices 240, 242 detect, the greater chance that the electronic devices 240, 242 are being transported via private vehicle. This is generally true because there are typically more electronic devices present on public transportation (e.g., electronic devices of other passengers) than there are in the vicinity of a private vehicle at a given point in time.

The electronic devices 240, 242 are further configured to periodically compare communication signals detected at an initial point in time to communication signals detected at a subsequent point in time. If electronic devices 240, 242 detect, at multiple points in time, substantially different communication signals that correspond to different electronic devices or components, the greater chance that the electronic devices 240, 242 are being transported via private vehicle. This contrasts with public transportation, when a given electronic device may detect the same electronic device at multiple points in time (e.g., if the electronic devices are all on the same train car), whereby an electronic device that is transported by a private vehicle may detect, at an initial time, electronic devices external to the private vehicle that the electronic device may pass by or otherwise fail to detect at a subsequent time.

Referring to FIG. 2, at a given point in time "A," the electronic device 240 of the private vehicle 224 may detect the access point 234 as well as any communication signals broadcast by the electronic device 236, and the electronic device 242 of the private vehicle 226 may detect the access point 233 as well as any communication signals broadcast by the electronic devices 232, 230. The number of detected connections signals (two for the electronic device 240 and three for the electronic device 242) may be below a threshold value (e.g., four) corresponding to public transportation, and the electronic devices 240, 242 may each deem that it is being transported via private vehicle.

At a subsequent point in time "B," the vehicles 224, 226 may have traveled a certain distance down the roadway 227 (e.g., the vehicle 224 travels through the intersection and the vehicle 226 makes a right-hand turn at the corner) such that the electronic device 240 may now detect communication signal(s) broadcast by the electronic device 232 and the electronic device 242 may now detect only the access point 233. Accordingly, the devices and components detected by the respective electronic devices 240, 242 across the points in time "A" and "B" are substantially different, and the electronic devices 240, 242 may therefore each deem that it is being transported via private vehicle. It should be appreciated that the electronic devices 240, 242 may determine mode of transportation via any combination of the analysis of the number of nearby devices or components or the analysis of the consistency of the detected signals at multiple points in time. In some embodiments, the electronic devices 240, 242 may refine or "confirm" their transportation modes based on GPS location data. For example, if location data of the electronic device 240 does not (or does) coincide with a train track, bus lane, or the like, then the electronic device 240 may confirm that it is being transported via private vehicle (or via public transportation).

Figure 3:
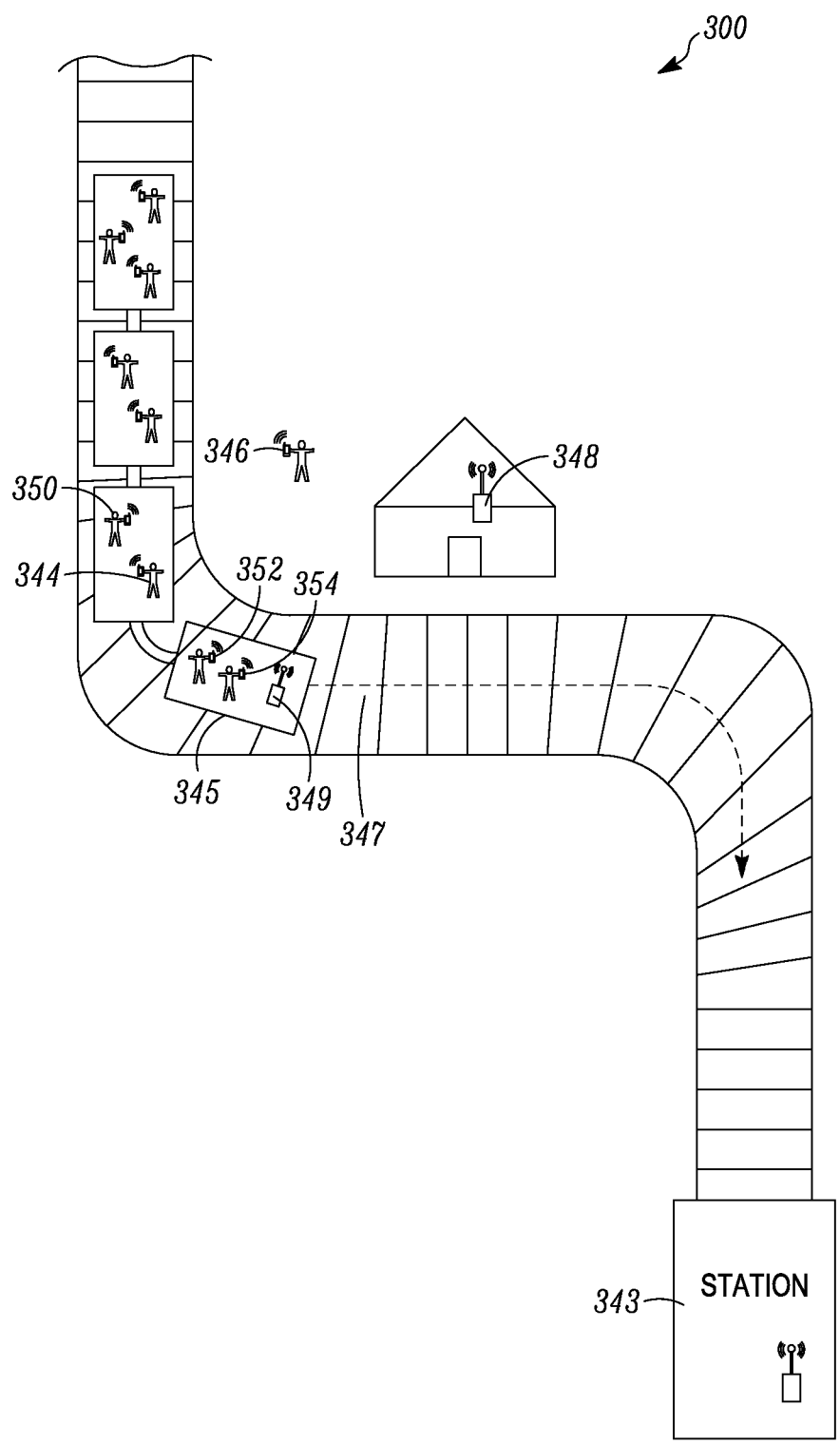
FIG. 3 depicts an example scenario illustrating an electronic device being transported via public transportation, in accordance with some embodiments.

Referring to FIG. 3, depicted is an additional example scenario 300 illustrating connection signal possibilities for an electronic device being transported via public transportation. It should be appreciated that the scenario 300 as described herein is additional to a velocity and/or acceleration calculation as further described with respect to FIGS. 4 and 5. The scenario 300 depicts a train 345 transporting a plurality of individuals, whereby the train 345 includes multiple train cars capable of traveling along a set of tracks 347. Similar to the scenario 200 discussed with respect to FIG. 2, each of the electronic devices being transported by the train 345 (as shown: electronic devices 344, 350, 352, 354) may detect communication signals from other electronic devices being transported by the train 345 or from other devices or components within detectable range of each of the electronic devices.

For example, at a given point in time "A," the electronic device 344 on the second car of the train 345 may detect respective communication signals broadcast by each of the electronic devices 350, 352, 354, as well as a communication signal from an external electronic device 346 and an external access point 348. The number of detected connections signals (four electronic devices and an access point) may be above a threshold value (e.g., four) corresponding to public transportation, and the electronic device 344 may therefore deem that it is being transported via public transportation.

At a subsequent point in time "B," the train 345 may have traveled a distance down the set of tracks 347 such that the electronic device 344 may no longer detect the access point 348, but will still detect communication signals from the electronic devices 350, 352, 354. Accordingly, the devices and components detected by the electronic device 344 across the points in time "A" and "B" are substantially consistent (i.e., the electronic device 344 detects each of the electronic devices 350, 352, 354 at multiple points in time), and the electronic device 344 may therefore deem that it is being transported via public transportation. It should be appreciated that the electronic device 344 may determine mode of transportation via any combination of the analysis of the number of nearby devices or components or the analysis of the consistency of the detected signals at multiple points in time.

Generally, it is a further indication that the electronic device 344 is being transported via public transportation if the electronic device 344 consistently detects an access point across multiple points in time, as this indicates that the access point is associated with the public transportation. Referring to FIG. 3, the electronic device 344 may detect an access point 349 of the train 345 itself. In operation, after detecting the access point 349, the electronic device can wait for a timeout period (e.g., ten (10) seconds, thirty (30) seconds, etc.), and then subsequently scan for and detect the access point 349 again. The signal broadcast by the access point 349 may include the SSID of the access point 349 and, in some embodiments, the electronic device 344 may perform a lexical analysis on the SSID to identify one or more terms, words, or phrases that may indicate that the access point 349 is associated with public transportation. For example, the SSID may contain generic terms or words such as "free," "hotspot," and/or the like; or may contain specific terms or words corresponding to known transit operators such as, for example, "CTA" (for Chicago Transit Authority), "BART" (for Bay Area Rapid Transit), or the like.

In further embodiments, the electronic device 344 may use GPS receiving information to interface with a maps database, or may otherwise access mapping data, as an additional factor to determine whether the electronic device 344 is being transported via public transportation. The maps database may include locations of various public transportation nodes (e.g., stations, bus routes, train tracks, etc.). The electronic device 344 can identify its location, such as via a location module 112, retrieve mapping data related to the location, and determine whether there is an associated public transportation node indicated in the mapping data. For example, referring to FIG. 3, if the train 345 enters a station 343, the electronic device 344 can retrieve mapping data associated with its location to determine that it is located in or near the station 343.

Figure 4:
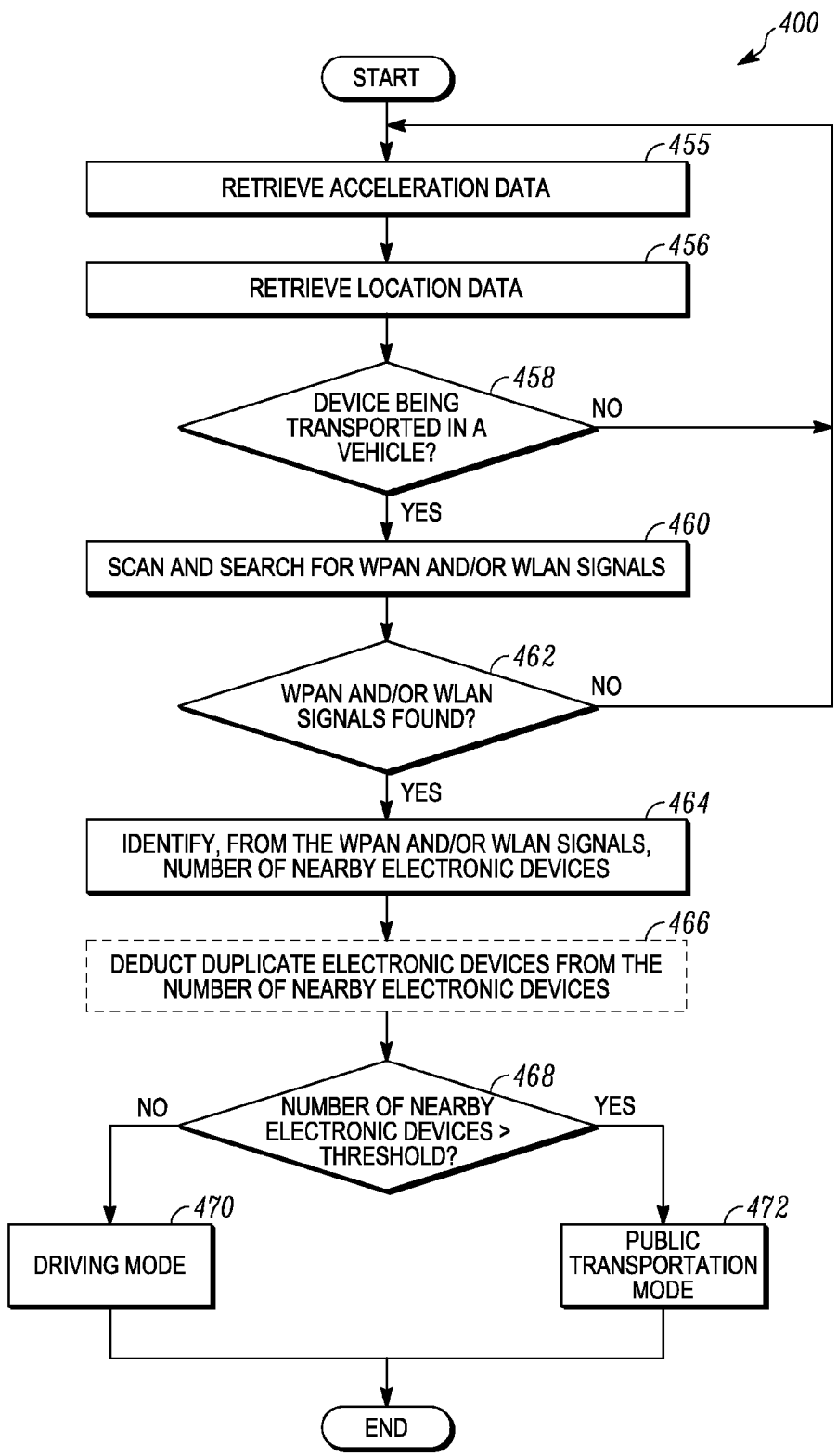
FIG. 4 depicts a flow diagram of an electronic device detecting various modes of transportation and modifying operating modes corresponding thereto, in accordance with some embodiments.

FIG. 4 is a flowchart of a method 400 for an electronic device (such as the electronic device 105) to detect various modes of transportation and to modify operating modes corresponding thereto. The order of the steps of the depicted flowchart of FIG. 4 can differ from the version shown, and certain steps can be eliminated, and/or certain other ones can be added, depending upon the implementation.

The method 400 begins with the electronic device retrieving 455 acceleration data. In particular, an application processor of the electronic device may retrieve the acceleration data from an accelerometer when a sensor hub (e.g., an auxiliary, low-power processor of the electronic device) determines possible vehicular movement based on acceleration data from the accelerometer. The application processor may also estimate or calculate an acceleration and a velocity of the electronic device based on the acceleration data. The electronic device (specifically, the application processor) can also retrieve 456 location data. In particular, the electronic device can retrieve the location data from a location module such as a GPS module, where the location data may be used to calculate an average velocity and acceleration of the electronic device. The average velocity calculated from the location data may be more accurate than the velocity calculated from the acceleration data.

The electronic device can determine 458, based on the location data and the acceleration data, whether the electronic device is being transported in a vehicle. Generally, when the location data, velocity, and acceleration data indicates particular movement and/or start/stop instances, then the chance increases that the electronic device is being transported in a vehicle. It should be appreciated that the electronic device supports various calculations, techniques, and algorithms to determine or to deem when it is being transported in a vehicle.

If the electronic device determines that it is not being transported in a vehicle ("NO"), processing can return to 455 or to any other functionality, such as normal or default functionality. If the electronic device determines that it is being transported in a vehicle ("YES"), the electronic device can scan and search 460 for WPAN and/or WLAN signals originating from nearby devices. As discussed herein, any WPAN and/or WLAN signals originating from nearby devices may include various information such as an identification of the respective device (e.g., a MAC address) or a WPAN address (i.e., a "friendly Bluetooth name"). The received signals may also each have an associated strength (i.e., RSSI) which may indicate the distance from the receiving electronic device to the electronic device that transmitted the signal.

The electronic device can determine 462 if any WPAN and/or WLAN signals are found. If the electronic device determines that no WPAN and/or WLAN signals are found ("NO"), processing can return to 456 or to any other functionality, such as normal or default functionality. If the electronic device detects any WPAN and/or WLAN signals ("YES"), the electronic device can identify 464, from the WPAN and/or WLAN signals, a number of nearby electronic devices. In particular, the electronic device can examine any device identifications included in the detected signals (e.g., MAC address, WPAN address) to tally the number of devices that originate the WPAN and/or WLAN signals. In an optional embodiment, the electronic device can deduct 466 any duplicate electronic devices from the number of nearby electronic devices. In particular, the electronic device may detect both a WPAN signal and a WLAN signal that are broadcast from the same device (i.e., the MAC address and the WPAN address correspond to the same device). In these cases, the electronic device may count this device as a single device versus two devices, and may update the number of nearby electronic devices accordingly. For example, if the electronic device detects eight (8) WLAN signals and four (4) WPAN signals, but the electronic device determines that two of the devices broadcast both a WLAN signal and a WPAN signal, then the electronic device can determine that there are ten (10) total devices.

The electronic device can determine 468 if the number of nearby electronic devices exceeds a threshold amount. It should be appreciated that the threshold amount may be a default number, a weighted value, or may be adjusted by a user or operator of the electronic device. For example, the threshold amount may be three (3), five (5), seven (7), or another amount. Generally, the greater the number of nearby electronic devices, the greater the chance that the electronic device is being transported via public transportation, as there will be more devices in proximity to the electronic device. If the electronic device determines that the number of nearby electronic devices exceeds the threshold amount ("YES"), the electronic device can deem that it is being transported via public transportation and can initiate 472 a public transportation mode where speaker output is muted. In contrast, if the electronic device determines that the number of nearby electronic devices does not meet or exceed the threshold amount ("NO"), the electronic device can deem that it is being transported via private vehicle and can initiate 470 a driving mode where speaker functionality is enabled.

Figure 5B:
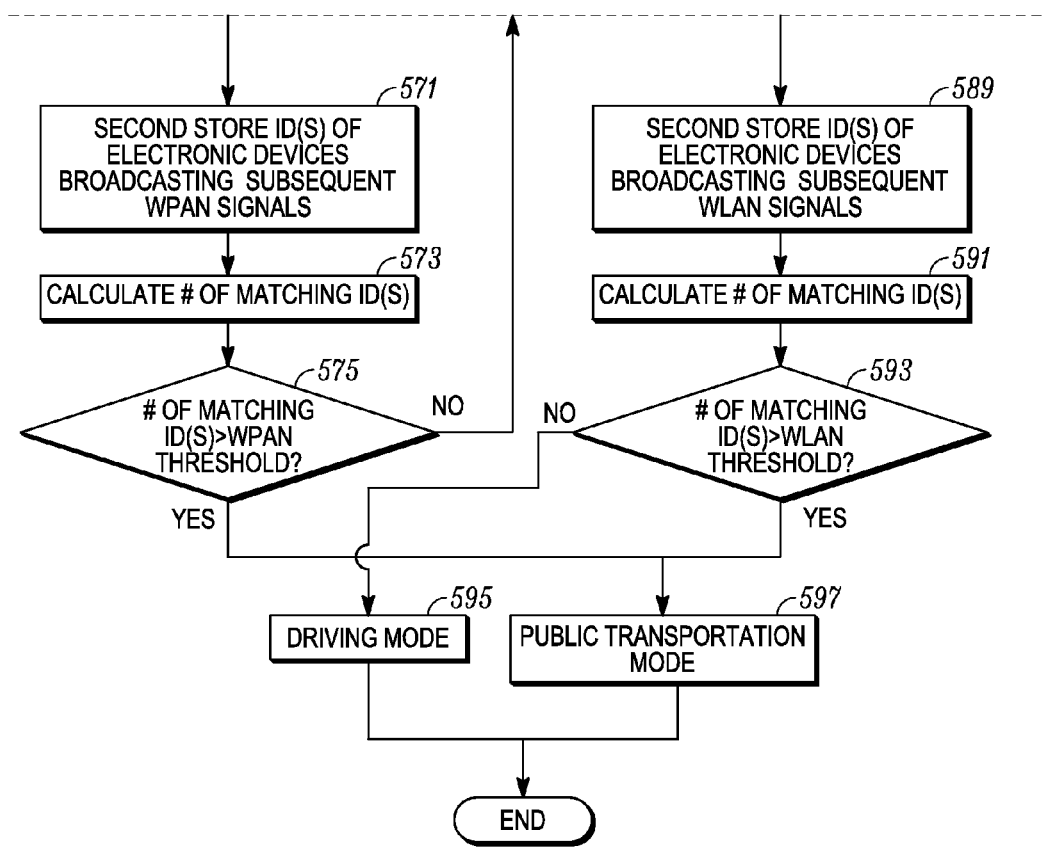

FIGS. 5A and 5B show a flowchart of another method 500 for an electronic device (such as the electronic device 105) to detect various modes of transportation and to modify operating modes corresponding thereto. The method 500 may be an alternative to the method 400 discussed with respect to FIG. 4. The order of the steps of the depicted flowchart of FIGS. 5A and 5B can differ from the version shown, and certain steps can be eliminated, and/or certain other ones can be added, depending upon the implementation.

The method 500 begins with the electronic device retrieving 554 acceleration data and retrieving 555 location data. In particular, an application processor of the electronic device may retrieve the acceleration data from an accelerometer when a sensor hub (e.g., an auxiliary, low-power processor of the electronic device) determines possible vehicular movement based on acceleration data from the accelerometer. The application processor may also estimate or calculate an acceleration and a velocity of the electronic device based on the acceleration data. The application processor can also retrieve the location data from a location module such as a GPS module, where the location data may be used to calculate an average velocity and acceleration of the electronic device. The average velocity calculated from the location data may be more accurate than the velocity calculated from the acceleration data.

The electronic device can determine 557, based on the location data and/or the acceleration data, whether the electronic device is being transported above a certain speed and infer that the electronic device is in a vehicle. Generally, when the location data and acceleration data indicates sustained movement above a given velocity and/or start/stop instances matching a vehicular signature, then the chance that the electronic device is being transported in a vehicle increases. It should be appreciated that the electronic device supports various calculations, techniques, and algorithms to determine or to deem when it is being transported in a vehicle.

If the electronic device determines 557 that it is not being transported in a vehicle ("NO"), processing can return to 554 or to any other functionality, such as normal or default functionality. If the electronic device determines that it is being transported in a vehicle ("YES"), the electronic device can scan and search 559 for WPAN signals originating from nearby devices. As discussed herein, any WPAN signals originating from nearby devices may include various information such as an identification of the respective device (e.g., a MAC address) or a WPAN address (i.e., a "friendly Bluetooth name"). The detected signals may also each have an associated strength (e.g., RSSI) which may roughly indicate a distance from the electronic device that detected the signal to the device that emitted the signal.

The electronic device can determine 561 if any WPAN signals are found. If the electronic device determines that no WPAN signals are found ("NO"), processing can proceed to 577. If the electronic device detects WPAN signals ("YES"), the electronic device can store 563 the identification(s) of electronic device(s) broadcasting the WPAN signal(s). In particular, for each detected signal, the electronic device can store a MAC address or WPAN device name included in the detected signal. The electronic device can pause or wait 565 for a designated WPAN timeout period. In embodiments, the WPAN timeout period may be a default value (e.g., one (1), five (5) or ten (10) minutes, etc.) or may be set by a user or operator of the electronic device.

After the WPAN timeout period, the electronic device can scan and search 567 again for WPAN signals. In embodiments, any of these WPAN signals may originate from the same device(s) as the WPAN signals detected in 559 or may originate from other devices. The electronic device can determine 569 whether any new or subsequent WPAN signals are detected or found. If the electronic device does not detect any WPAN signals ("NO") at this time, processing can proceed to 577. If the electronic device detects new or subsequent WPAN signals ("YES"), the electronic device can store 571 the identification(s) of electronic device(s) broadcasting the new or subsequent WPAN signal(s). In particular, for each detected signal, the electronic device can store a MAC address or WPAN device name included in the detected signal.

The electronic device can calculate 573 a number of matching identification(s) between the first set of detected WPAN signals and the subsequent set of detected WPAN signals. In particular, the electronic device can compare the initial set of stored identification(s) to the subsequent set of stored identification(s) to determine how many of the initial identification(s) and the subsequent identification(s) match. The electronic device can then determine 575 if the number of matching identification(s) exceeds a corresponding WPAN threshold. It should be appreciated that the WPAN threshold may be a default amount (e.g., one, three, or five matches, etc.) or may be adjusted by a user or operator of the electronic device. Generally, the greater the number of matching identification(s), the greater the chance that the electronic device is being transported via public transportation, as the nearby devices corresponding to the matching identifications will be in range of the electronic device before and after the WPAN timeout period. Accordingly, if the number of matching identification(s) exceeds the corresponding WPAN threshold, the electronic device can deem that it is being transported via public transportation and can initiate 597 a public transportation mode. In contrast, if the electronic device determines that the number of matching identification(s) does not meet or exceed the corresponding WPAN threshold ("NO"), processing can proceed to 577.

At 577, the electronic device can search for WLAN signals originating from nearby devices. As discussed herein, any WLAN signals originating from nearby devices may include various information such as an identification of the respective device (e.g., a MAC address). The signals may also each have an associated strength (i.e., RSSI) which may generally indicate a distance from the respective device to the electronic device that detects the signal.

The electronic device can determine 579 if any WLAN signals are found. If the electronic device determines that no WLAN signals are found ("NO"), processing can return to 554 or to any other functionality, such as normal or default functionality. If the electronic device detects any WLAN signals ("YES"), the electronic device can store 581 the identification(s) of electronic device(s) broadcasting the WLAN signal(s). In particular, for each detected signal, the electronic device can store a MAC address included in the detected signal. The electronic device can pause or wait 583 for a designated WLAN timeout period. In embodiments, the WLAN timeout period may be a default value (e.g., ten (10) seconds, thirty (30) seconds, etc.) or may be set by a user or operator of the electronic device. The WLAN timeout period may be the same or different from the WPAN timeout period 565

After the WLAN timeout period, the electronic device can search 585 again for WLAN signals. In embodiments, any of these WLAN signals may originate from the same devices as the WLAN signals detected in 577, or may originate from other devices. The electronic device can determine 587 whether any new or subsequent WLAN signals are detected or found. If the electronic device does not detect any WLAN signals ("NO") at this time, processing can return to 554 or to any other functionality, such as normal or default functionality. If the electronic device detects new or subsequent WLAN signals ("YES"), the electronic device can store 589 the identification(s) of electronic device(s) broadcasting the new or subsequent WLAN signal(s). In particular, for each detected signal, the electronic device can store a MAC address included in the detected signal.

The electronic device can calculate 591 a number of matching identification(s) between the first set of detected WLAN signals and the subsequent set of detected WLAN signals. In particular, the electronic device can compare the initial set of stored identification(s) to the subsequent set of stored identification(s) to determine how many of the initial identification(s) and the subsequent identification(s) match. The electronic device can then determine 593 if the number of matching identification(s) exceeds a corresponding WLAN threshold. It should be appreciated that the WLAN threshold may be a default amount (e.g., three, five, seven matches, etc.) or may be adjusted by a user or operator of the electronic device. Generally, the greater the number of matching identification(s), the greater the chance that the electronic device is being transported via public transportation, as the nearby devices corresponding to the matching identifications will be in range of the electronic device before and after the timeout period. Accordingly, if the number of matching identification(s) exceeds the corresponding WLAN threshold, the electronic device can deem that it is being transported via public transportation and can initiate 597 a public transportation mode. In contrast, if the electronic device determines that the number of matching identification(s) does not meet or exceed the corresponding WLAN threshold ("NO"), the electronic device can deem that it is being transported via private vehicle and can initiate 595 a driving mode.

It should be appreciated that the determinations of 575 and 593 may be combined based on a combination of corresponding WLAN and WPAN thresholds and/or weightings of WLAN and WPAN thresholds. For example, the electronic device may determine that it is being transported via public transportation when both number of matching WPAN device IDs exceeds four (4) and the number of matching WLAN device IDs exceeds two (2). For further example, the electronic device may determine that it is being transported via public transportation when 0.75*(the number matching WLAN device IDs) plus 0.50*(the number of matching WPAN device IDs) exceeds six (6). Note also that either or both timeout loops may recur to extend the WLAN and/or WPAN device ID matching process across multiple timeout periods.

FIG. 6 illustrates an example interface 676 displayable by a user interface of an electronic device, such as the user interface 103 of the electronic device 105 discussed with respect to FIG. 1. In embodiments, the electronic device may display the interface 676 in response to entering a driving mode (i.e., if the electronic device determines that it is being transported via private vehicle). As illustrated in FIG. 6, the interface 676 indicates two functionalities associated with driving mode: "talk to me" which refers to the electronic device audibly annunciating text messages and identifications of calling parties, and "resume music play" which refers to the electronic device pairing with a network connection (e.g., a WPAN connection) of the vehicle and initiating music playback via a device application. It should be appreciated that additional functionalities associated with a driving mode are envisioned.

FIG. 7 illustrates an example interface 778 displayable by a user interface of an electronic device, such as the user interface 103 of the electronic device 105 discussed with respect to FIG. 1. In embodiments, the electronic device may display the interface 778 in response to entering a public transportation mode (i.e., if the electronic device determines that it is being transported via public transportation). As illustrated in FIG. 7, the interface 778 indicates two functionalities associated with public transportation mode: "mute ringer" which refers to the electronic device automatically muting or silencing the ringer of the electronic device when an incoming call is received, and "auto reply" which refers to the electronic device automatically sending a pre-determined reply message (e.g., "I can't talk right now") to a calling party if the calling party is included on the favorites list of the electronic device. It should be appreciated that additional functionalities associated with a driving mode are envisioned.

Figure 8:
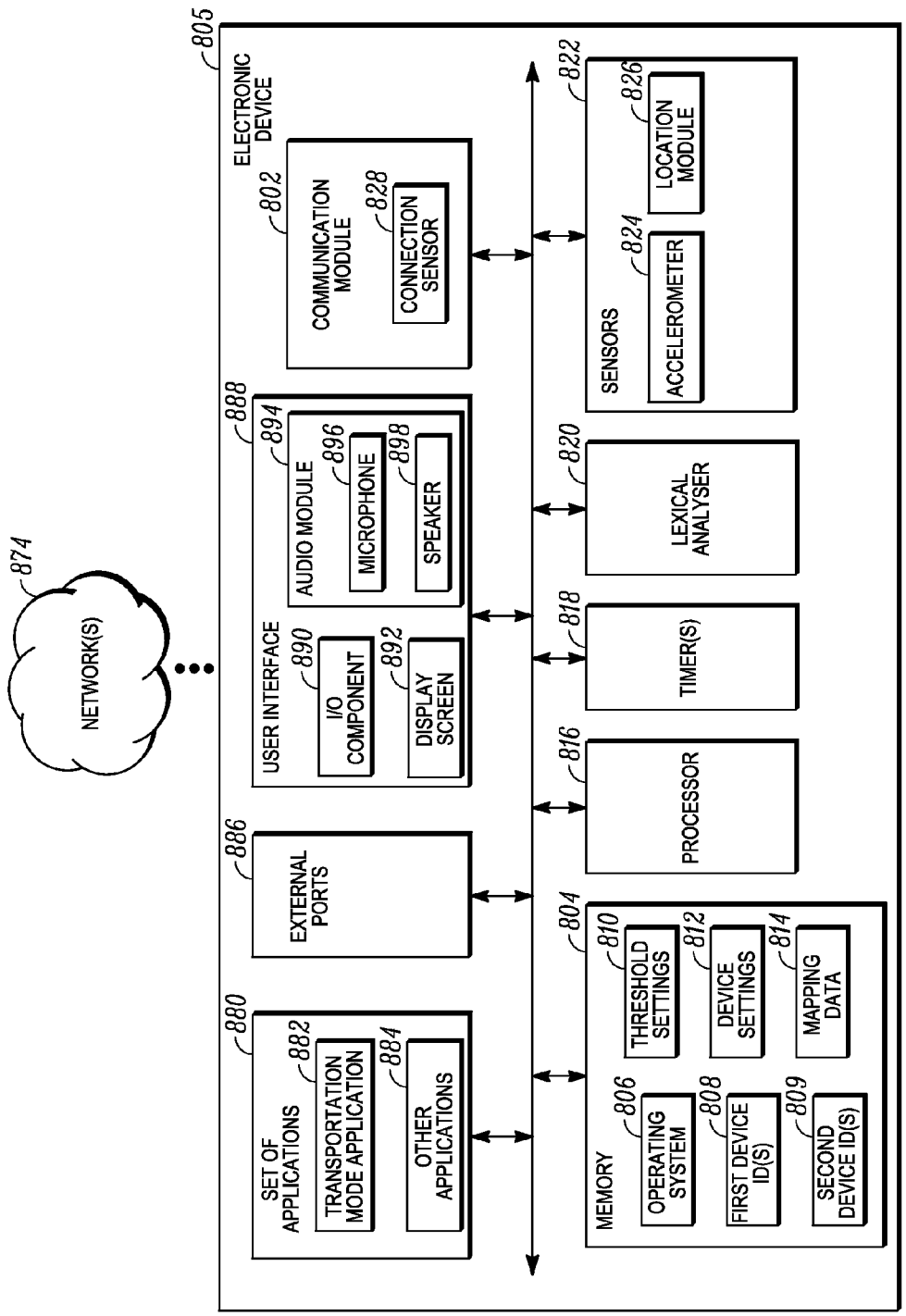
FIG. 8 is a block diagram of an electronic device in accordance with some embodiments.

FIG. 8 illustrates an example electronic device 805 (such as the electronic device 105 discussed with respect to FIG. 1, or other devices) in which the functionalities as discussed herein may be implemented. The electronic device 805 can include a processor 816 or other similar type of controller module or microcontroller, as well as a memory 804. The memory 804 can store an operating system 806 capable of facilitating the functionalities as discussed herein. The memory 804 can also store a first set of device ID(s) 808 corresponding to a first instance of detected devices, a second set of device ID(s) 809 corresponding to a second instance of detected devices, and a set of threshold settings 810 associated with a mode of transportation analysis, a set of device settings 812 associated with various operating modes for the electronic device 805, and a set of mapping data 814. In embodiments, the threshold settings 810 may include threshold settings for WPAN connections only, WLAN connections only, and/or a combination of WPAN and WLAN connections (as well as any weightings).

The processor 816 can interface with the memory 804 to execute the operating system 806 and a set of applications 880. The set of applications 880 (which the memory 804 can also store) can include a transportation mode application 882 configured to analyze connection signal data to determine a mode of transportation for the electronic device 805. The set of applications 880 can also include one or more other applications 884 such as, for example, music and entertainment applications, phone applications, messaging applications, calendar applications, social networking applications, utilities, productivity applications, games, travel applications, communication application, shopping applications, finance applications, sports applications, photography applications, mapping applications, weather applications, applications for connecting to an online marketplace, and/or other applications.

Generally, the memory 804 can include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 804 can further include a communication module 802 configured to interface with one or more external ports 886 to communicate data via one or more networks 874. For example, the communication module 802 can leverage the external ports 886 to establish a wide area network for connecting the electronic device 805 to other components such as a remote data server. According to some embodiments, the communication module 802 can include one or more transceivers functioning in accordance with IEEE standards, 3GPP standards, or other standards, and configured to receive and transmit data via the one or more external ports 886. More particularly, the communication module 802 can include one or more WWAN, WLAN, and/or WPAN transceivers configured to connect the electronic device 805 to wide area networks, local area networks, and/or personal area networks, as well as a connection sensor 828. The electronic device 805 can further include a set of sensors 822 such as an accelerometer 824 and a location module 826.

The electronic device 805 may further include a user interface 888 configured to present information to the user and/or receive inputs from the user. As illustrated in FIG. 8, the user interface 888 includes a display screen 892 and I/O components 890 (e.g., capacitive or resistive touch sensitive input panels, keys, buttons, lights, LEDs, cursor control devices, haptic devices, and others). In embodiments, the display screen 892 is a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 888 may further include an audio module 894 including hardware components such as one or more speakers 898 for outputting audio data and one or more microphones 896 for detecting or receiving audio.

In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 816 (e.g., working in connection with the operating system 806) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Thus, it should be clear from the preceding disclosure that the systems and methods offer effective usability of electronic devices. In particular, the embodiments enable accurate transportation mode identification such that appropriate device operating modes may be initiated.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method comprising:
   determining, by an electronic device and based on movement data, that the electronic device is being transported by a vehicle;
   detecting, by the electronic device, at least one of (i) wireless personal area network (WPAN) connection signal data of at least one nearby electronic device to identify a number of the at least one nearby electronic device enabled for WPAN communication, or (ii) wireless local area network (WLAN) connection signal data of the at least one nearby electronic device to identify a number of the at least one nearby electronic device enabled for WLAN communication;
   analyzing, by the electronic device, the at least one of the WPAN connection signal data or the WLAN connection signal data to determine that at least one of (i) the number of the at least one nearby electronic device enabled for WPAN communication or (ii) the number of the at least one nearby electronic device enabled for WLAN communication exceeds a threshold value; and
   responsive to the determining and analyzing, initiating, by the electronic device, a public transportation operating mode for the electronic device.

2. The method of claim 1, wherein analyzing the at least one of the WPAN connection signal data or the WLAN connection signal data comprises:
   calculating, based on (i) the number of the at least one nearby electronic device enabled for WPAN communication and (ii) the number of the at least one nearby electronic device enabled for WLAN communication, a total number of the at least one nearby electronic device enabled for wireless communication; and
   determining that the total number of the at least one nearby electronic device exceeds a particular value.

3. The method of claim 2, wherein calculating the total number of the at least one nearby electronic device comprises:
   analyzing respective unique identifiers included in the WPAN connection signal data and the WLAN connection signal data to remove duplicates of the at least one nearby electronic device.

4. The method of claim 1, further comprising:
   identifying an available WLAN access point; and
   determining, while the electronic device is being transported, that the available WLAN access point is available both before and after a threshold period of time,
   wherein the analyzing is further based on determining that the available WLAN access point is available both before and after the threshold period of time.

5. The method of claim 4, further comprising:
   identifying a service set identifier (SSID) of the available WLAN access point; and
   performing a lexical analysis on the SSID,
   wherein the analyzing is further based on the lexical analysis on the SSID.

6. The method of claim 1, further comprising:
   storing respective unique identifiers included the at least one of the WPAN connection signal data or the WLAN connection signal data.

7. The method of claim 1, further comprising:
   retrieving current location data of the electronic device; and
   determining that the current location data coincides with a public transportation node,
   wherein the analyzing is further based on determining that the current location data coincides with the public transportation node.

8. The method of claim 1, wherein initiating the public transportation operating mode for the electronic device comprises:
   preventing audio output via a built-in speaker of the electronic device.

9. An electronic device comprising:
   a wireless location module configured to generate location data associated with the electronic device;
   a wireless connection sensor configured to detect at least one of (i) wireless personal area network (WPAN) connection signal data of at least one nearby electronic device to identify a number of the at least one nearby electronic device enabled for WPAN communication, or (ii) wireless local area network (WLAN) connection signal data of the at least one nearby electronic device to identify a number of the at least one nearby electronic device enabled for WLAN communication;
   a processor adapted to interface with the wireless location module and the wireless connection sensor, wherein the processor is configured to:
      determine, based on the location data from the wireless location module, that the electronic device is being transported by a vehicle,
      analyze the at least one of the WPAN connection signal data or the WLAN connection signal data to determine that at least one of (i) the number of the at least one nearby electronic device enabled for WPAN communication or (ii) the number of the at least one nearby electronic device enabled for WLAN communication exceeds a threshold value, and
      responsive to the analyzing, initiate a public transportation operating mode for the electronic device.

10. The electronic device of claim 9, further comprising a memory for storing unique identifiers included in the at least one of the WPAN connection signal data or the WLAN connection signal data.

11. The electronic device of claim 10, wherein the processor is further configured to:
 identify, from the at least one of the WPAN connection signal data or the WLAN connection signal data, at least one respective unique identifier of the at least one nearby electronic device, and
 cause the memory to store the at least one respective unique identifier.

12. The electronic device of claim 11, further comprising a timer configured to wait for a timeout period, wherein after the timeout period has expired:
 the wireless connection sensor is further configured to detect at least one of (i) subsequent WPAN connection signal data of the at least one nearby electronic device or (ii) subsequent WLAN connection signal data of the at least one nearby electronic device; and
 the processor is further configured to:
  identify, from the at least one of the subsequent WPAN connection signal data or the subsequent WLAN connection signal data, at least one respective additional unique identifier of the at least one nearby electronic device, and
  compare the at least one respective unique identifier stored in the memory to the at least one respective additional unique identifier.

13. The electronic device of claim 9, further comprising a memory for storing a set of device settings, wherein the processor is further configured to:
 retrieve, from the set of device settings in the memory, a set of public transportation device settings.

14. The electronic device of claim 13, further comprising a built-in speaker, wherein the set of public transportation device settings includes a setting to prevent audio from being output via the built-in speaker.

15. The electronic device of claim 9, further comprising:
 an accelerometer configured to generate acceleration data associated with the electronic device,
 wherein the processor determines that the electronic device is being transported by the vehicle further based on the acceleration data.

16. The electronic device of claim 9, further comprising a memory for storing mapping data wherein the processor is further configured to:
 retrieve, from the memory, a set of mapping data based on the location data; and
 determine that the location data coincides with a public transportation node included in the set of mapping data.

17. The electronic device of claim 9, further comprising:
 a communication module configured to identify an available wireless local area network (WLAN) access point;
 a memory for storing a set of terms related to public transportation; and
 a lexical analyzer configured to:
  identify a service set identifier (SSID) of the available WLAN access point, and
  compare at least a portion of the SSID to the set of terms related to public transportation.

\* \* \* \* \*